(12) United States Patent
Ozog et al.

(10) Patent No.: US 12,345,312 B2
(45) Date of Patent: Jul. 1, 2025

(54) DISCRETE ROLLER ASSEMBLY-BASED HELICAL DRIVE FOR TRANSLATION

(71) Applicant: Mytra, Inc., South San Francisco, CA (US)

(72) Inventors: Stefan Ozog, Winnipeg (CA); Daniel Livingston, Hayward, CA (US); Gagandeep Thable, Calgary (CA)

(73) Assignee: Mytra, Inc., South San Francisco, CA (US)

( * ) Notice: Subject to any disclaimer, the term of this patent is extended or adjusted under 35 U.S.C. 154(b) by 26 days.

(21) Appl. No.: 18/531,184

(22) Filed: Dec. 6, 2023

(65) Prior Publication Data

US 2024/0183428 A1 Jun. 6, 2024

Related U.S. Application Data

(60) Provisional application No. 63/430,544, filed on Dec. 6, 2022.

(51) Int. Cl.
| | | |
|---|---|---|
| *F16H 1/08* | (2006.01) | |
| *F16H 1/10* | (2006.01) | |
| *F16H 55/10* | (2006.01) | |
| *F16H 55/22* | (2006.01) | |

(52) U.S. Cl.
CPC .............. *F16H 1/08* (2013.01); *F16H 1/10* (2013.01); *F16H 55/10* (2013.01); *F16H 55/22* (2013.01)

(58) Field of Classification Search
CPC .... F16H 1/166; F16H 25/2261; F16H 27/045; F16H 2025/228
See application file for complete search history.

(56) References Cited

U.S. PATENT DOCUMENTS

| | | | |
|---|---|---|---|
| 4,285,249 A | 8/1981 | Kume | |
| 4,541,297 A | 9/1985 | Fujita | |
| 6,598,708 B2 * | 7/2003 | St-Germain | ............ B66B 9/025 |
| | | | 187/268 |
| 2014/0182977 A1 | 7/2014 | Chen | |

FOREIGN PATENT DOCUMENTS

| | | | | |
|---|---|---|---|---|
| CN | 109099128 A | * | 12/2018 | |
| DE | 102005006475 B3 | * | 5/2006 | ......... F16H 25/2247 |
| GB | 2059540 A | * | 4/1981 | ............... B66B 9/02 |

\* cited by examiner

*Primary Examiner* — Jake Cook
(74) *Attorney, Agent, or Firm* — Jeffrey Schox; Evan Myers

(57) ABSTRACT

Systems and methods for operation and assembly of a helical drive are provided. A helical drive includes a discrete roller assembly-based roller worm including a body portion and a plurality of discrete roller assemblies disposed in a first helical pattern about the body portion. The helical drive includes an engagement structure including a primary axis, wherein the roller worm is configured to rotate about a central axis to cause linear translation of the roller worm along a length of the engagement structure and the primary axis. The engagement structure includes a plurality of tracks disposed along the length of the engagement structure, where each of the tracks is configured to receive at least one of the roller assemblies during the rotation of the roller worm.

42 Claims, 13 Drawing Sheets

DISCRETE ROLLER ASSEMBLY-BASED HELICAL DRIVE FOR TRANSLATION

CROSS REFERENCE TO RELATED APPLICATIONS

The present application claims the benefit of and priority to U.S. Provisional Application Ser. No. 63/430,544, entitled "DISCRETE BEARING-BASED WORM GEAR FOR TRANSLATION," filed on Dec. 6, 2022, which is hereby incorporated by reference in its entirety.

TECHNICAL FIELD

The following disclosure is directed to methods and systems for robotic movement, more specifically, methods and systems for operation and assembly of a discrete roller assembly-based helical drive used for translation along an axis.

BACKGROUND

A conventional threaded rod and nut mechanism can provide a motion transmission that can be used to mechanically translate a payload (e.g., a robot) along an axis. When the nut is split radially into a number of sections, each section could act upon the threaded rod (also referred to as a "threaded shaft" and "screw") similar to a conventional worm gear by contacting and applying force to the nut at only a portion of the thread's circumference. As an example, a worm gear mated to a rack to form a conventional worm drive can be used to move a robot coupled to the worm gear upward or downward along a vertical axis in a controlled manner. Such a conventional worm gear can produce a sliding frictional drag force (e.g., friction between a worm gear and a toothed wheel or frame) during operation of the worm gear. In a conventional worm drive, the sliding frictional force is proportional to a torque transmitted by the worm gear to the rack. Further, using a worm gear to lift a payload (e.g., a robot included in an automated storage and retrieval system (AS/RS)) relative to a frame (e.g., rack) can generate an additional fixed frictional drag force from a weight of the payload. This frictional drag force can contribute large power losses and provide added wear to worm drive components. By conservation of energy, this power is transformed primarily into heat, which can contribute to material property degradation and risk human safety associated with devices and/or machines that incorporate the worm drive components.

In some cases, replacing sliding friction elements of the worm drive with rolling elements can reduce frictional losses and wear of components involving sliding friction. Conventional solutions to the shortcomings involved with sliding frictional mechanisms can include replacing sliding friction elements with ball screws and/or roller screws, where individual rolling elements are contained between a nut and threaded rod. As an example, ball bearings included in a ball screw may contact and roll between the screw and nut components of the ball screw, where the ball bearings are recirculated in a ball return tube coupled to the nut during relative motion between the screw and the nut. However, such solutions are unable to accommodate engagement and disengagement between a screw and a section of a nut as described with respect to a worm drive, which may be necessary based on an application of the nut, threaded rod, and rolling elements.

SUMMARY

To address the aforementioned shortcomings, a discrete roller assembly-based helical drive system used for translation along an axis is provided. Further, systems and methods incorporating the discrete roller assembly-based helical drive are provided. In one embodiment, a roller worm configured for translation along a primary axis is provided. In one aspect, the roller worm can include a body portion, and a plurality of discrete roller assemblies disposed in a first helical pattern about the body portion, where the roller worm is configured to rotate about a central axis to cause linear translation of the roller worm along a length of an engagement structure and the primary axis.

The roller worm may also include where the body portion includes a cylindrical structure including a first circular base, a second circular base, and a central body portion connecting the first circular base to the second circular base. The roller worm may also include where the central axis is parallel to and collinear with the primary axis. The roller worm may also include where the central axis is not parallel to the primary axis. The roller worm may also include where the roller assemblies have at least one of a cylindrical structure, a conical structure, or an ellipsoid structure. The roller worm may also include where the roller assemblies are disposed in the first helical pattern for at least one turn about the body portion. The roller worm may also include where the roller assemblies extend from a surface of the body portion along a respective roller assembly axis at an angle greater than 0 degrees and less than 180 degrees relative to the central axis. The roller worm may also include where a ratio of a pitch of the first helical pattern to a diameter of the body portion is in a range of 0.3 to 3.2. The roller worm may also include where a ratio of a diameter of each of the roller assemblies to a diameter of the body portion is in a range of 0.2 to 0.6. The roller worm may also include where at least one of the roller assemblies includes a roller element on an exterior of the roller assembly, where the roller element is configured to rotate about a roller assembly axis. The roller worm may also include where the engagement structure includes a plurality of tracks disposed along the length of the engagement structure. The roller worm may also include where a drive component is configured to cause rotation of the roller worm. The roller worm may also include where at least one supporting element is configured to cause the roller worm to linearly translate along the primary axis based on rotation of the roller worm about the central axis.

In some aspects, the roller worm may also include where the central axis extends through a center of each of the first circular base and the second circular base. The roller worm may also include where a surface of the central body portion is parallel to the central axis. The roller worm may also include where the at least one of the roller assemblies further includes (i) at least one inner race coupled to the body portion and (ii) at least one outer race rotationally coupled to the at least one inner race and configured to rotate about the roller assembly axis, where the roller element is coupled to the at least one outer race or the at least one outer race includes the roller element. The roller worm may also include where each of the tracks is configured to receive at least one of the roller assemblies. The roller worm may also include where each of the tracks includes a complementary geometry relative to the roller assemblies. The roller worm may also include where each of the tracks includes at least one contact surface configured to contact at least one of the roller assemblies. The roller worm may also include where the roller assemblies are configured to (i) rotate about the central axis and (ii) contact the contact surfaces to cause translation of the roller worm along the length of the engagement structure. The roller worm may also include where the tracks are disposed in a second helical pattern along the length of the engagement structure, where a first pitch of the first helical pattern is equivalent to a second pitch of the second helical pattern. The roller worm may also include where the tracks are evenly spaced along the length of the engagement structure.

In another embodiment, a helical drive system is provided. In one aspect, the helical drive system can include a roller worm including a body portion, and a plurality of discrete roller assemblies disposed in a first helical pattern about the body portion. The helical drive system can also include an engagement structure including a primary axis, where the roller worm is configured to rotate about a central axis to cause linear translation of the roller worm along a length of the engagement structure and the primary axis.

In some aspects, the helical drive system may also include where the body portion includes a cylindrical structure including a first circular base, a second circular base, and a central body portion connecting the first circular base to the second circular base. The helical drive system may also include where the central axis is parallel to and collinear with the primary axis. The helical drive system may also include where the central axis is not parallel to the primary axis. The helical drive system may also include where the roller assemblies have at least one of a cylindrical structure, a conical structure, or an ellipsoid structure. The helical drive system may also include where the roller assemblies are disposed in the first helical pattern for at least one turn about the body portion. The helical drive system may also include where the roller assemblies extend from a surface of the body portion along a respective roller assembly axis at an angle greater than 0 degrees and less than 180 degrees relative to the central axis. The helical drive system may also include where a ratio of a pitch of the first helical pattern to a diameter of the body portion is in a range of 0.3 to 3.2. The helical drive system may also include where a ratio of a diameter of each of the roller assemblies to a diameter of the body portion is in a range of 0.2 to 0.6. The helical drive system may also include where at least one of the roller assemblies includes a roller element on an exterior of the roller assembly, where the roller element is configured to rotate about a roller assembly axis. The helical drive system may also include where the engagement structure includes a plurality of tracks disposed along the length of the engagement structure. The helical drive system may also include where a drive component is configured to cause rotation of the roller worm. The helical drive system may also include where at least one supporting element is configured to cause the roller worm to linearly translate along the primary axis based on rotation of the roller worm about the central axis.

In some aspects, the helical drive system may also include where the central axis extends through a center of each of the first circular base and the second circular base. The helical drive system may also include where a surface of the central body portion is parallel to the central axis. The helical drive system may also include where the at least one of the roller assemblies further includes (i) at least one inner race coupled to the body portion and (ii) at least one outer race rotationally coupled to the at least one inner race and configured to rotate about the roller assembly axis, where the roller element is coupled to the at least one outer race or the at least one outer race includes the roller element. The helical drive system may also include where each of the tracks is configured to receive at least one of the roller assemblies. The helical drive system may also include where each of the tracks includes a complementary geometry relative to the roller assemblies. The helical drive system may also include where each of the tracks includes at least one contact surface configured to contact at least one of the roller assemblies. The helical drive system may also include where the roller assemblies are configured to (i) rotate about the central axis and (ii) contact the contact surfaces to cause translation of the roller worm along the length of the engagement structure. The helical drive system may also include where the tracks are disposed in a second helical pattern along the length of the engagement structure, where a first pitch of the first helical pattern is equivalent to a second pitch of the second helical pattern. The helical drive system may also include where the tracks are evenly spaced along the length of the engagement structure.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
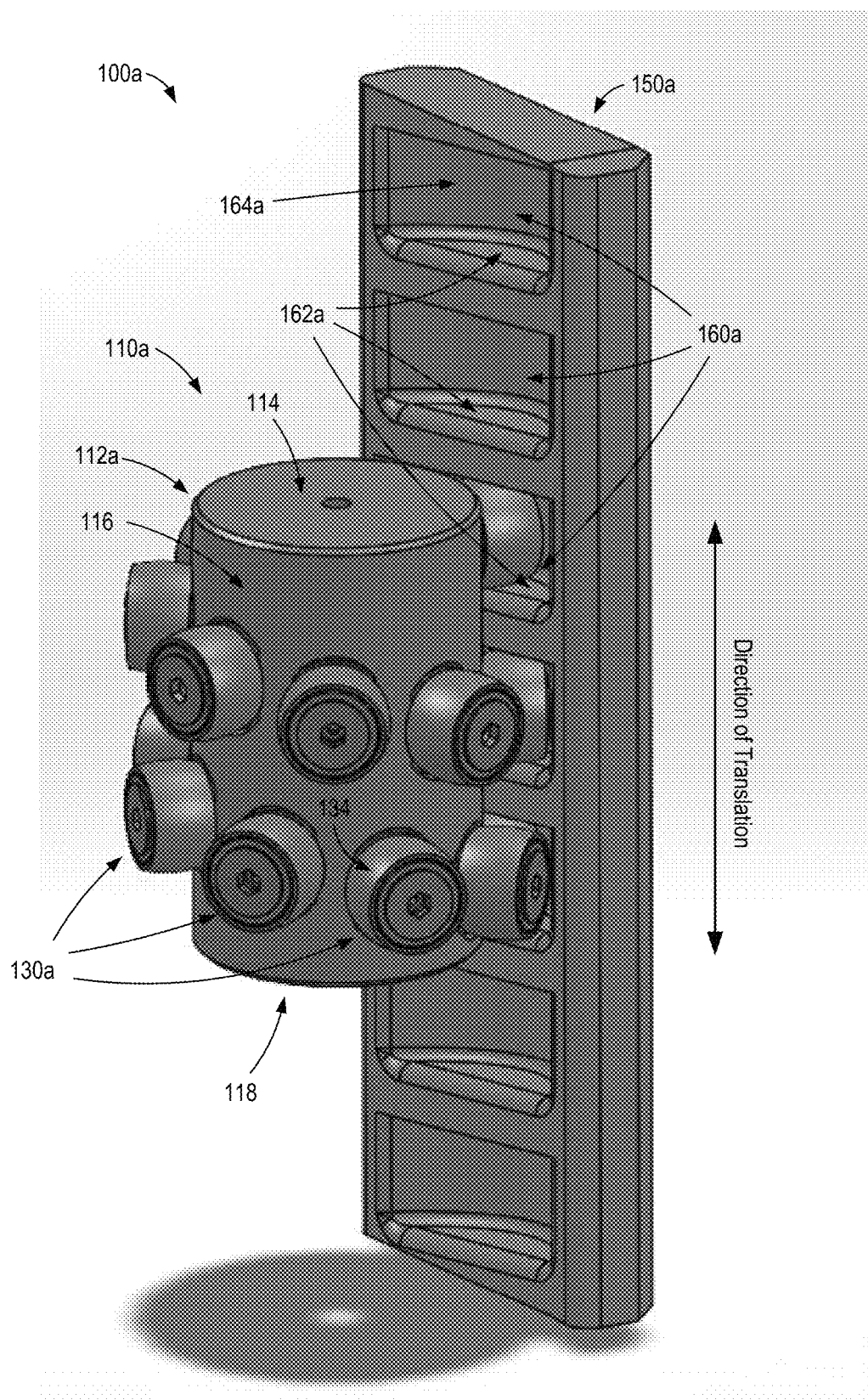
FIG. 1A illustrates a first perspective view of an exemplary discrete roller assembly-based helical drive including an exemplary roller worm and an exemplary engagement structure, according to some embodiments.

The figures (FIGS.) and the following description relate to some embodiments by way of illustration only. It is to be noted that from the following description, alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It is to be noted that wherever practicable, similar or like reference numbers may be used in the figures and may indicate similar or like functionality. The figures depict some embodiments of the disclosed structures or systems (or methods) for purposes of illustration only. One skilled in the art will readily recognize from the following description that alternative embodiments of the structures and methods illustrated herein may be employed without departing from the principles described herein.

As described herein, a conventional worm drive produces a sliding frictional drag force via friction between a worm gear and a toothed wheel or frame configured to interface with threads of the worm gear. Further, using a worm drive to lift a payload relative to a frame can generate an additional frictional drag force based on the payload's added weight. Solutions to reduce the frictional forces of conventional worm drives include use of rolling elements between a screw and threaded nut. However, as described above, these conventional mechanisms still have certain limitations, such as increased frictional drag forces (e.g., causing increased wear on included components) and an inability to accommodate engagement and disengagement between a screw and a section of a threaded nut.

The present disclosure addresses the aforementioned problems and other problems of existing mechanical translation systems by providing a discrete roller assembly-based roller worm configured for translation along an axis via contact with an engagement structure (e.g., a rack or frame), where the discrete roller assembly-based roller worm and engagement structure form a helical drive. The discrete roller assembly-based roller worm (referred herein to as a "roller worm") may include a cylindrical (e.g., substantially cylindrical) body portion (e.g., core) with discrete roller assemblies disposed about the body portion in a helical pattern that replace a continuous, helical thread of a conventional worm gear. The discrete roller assemblies may be (i) structured and arranged to provide a complementary surface between the body portion of the roller worm and an engagement structure (e.g., a frame or rack), (ii) structured and arranged to accommodate engagement and disengagement between the roller worm and the engagement structure, and (iii) constrained to a surface of the roller worm.

In some embodiments, an engagement structure may be a linear rack, where the roller worm is configured to translate along a length of the rack. The linear rack may include varying geometry along the length of the rack to enable engagement and disengagement between the discrete roller assemblies of the roller worm and the rack and/or to contain (e.g., capture) a roller worm and prevent disengagement between the roller worm and the rack. In some cases, the rack may include a number of concave structures configured to receive the roller assemblies of the roller worm, such that the concave structures are complementary to the structures of the discrete roller assemblies. The discrete roller assemblies of the roller worm may be (i) fixed to a surface of the body portion the roller worm and (ii) configured to engage with and rotate along a surface of the rack to generate a linear thrust force, thereby causing linear translation of the roller worm along an axis corresponding to a length of the rack. The linear thrust force may act on a roller worm-to-rack interface and may be normal to a contact surface of the rack at which at least one discrete roller assembly contacts the rack. While the engagement structure is described herein as having a linear structure, the engagement structure may be a curved structure, thereby enabling arcuate translation of the roller worm along the engagement structure.

In some embodiments, motion of the roller worm may include and/or be constrained to (i) rotation about an axis (e.g., a primary, central axis) of the roller worm and translation along an axis (e.g., a primary axis) of the rack. By constraining motion of the roller worm as described herein, rotation of the roller worm about its central axis can cause the roller worm to linearly translate along the axis of the rack (e.g., corresponding to a length of the rack) via complementary forces. In some cases, a drive component (e.g., an external motor) may cause rotation of the roller worm about an axis (e.g., central axis) of the roller worm, thereby causing the roller worm to linearly translate along an axis of the rack.

In some embodiments, the axis about which the roller worm rotates and the axis along which the roller worm linearly translates may be oriented in parallel. In other cases, the axis about which the roller worm rotates may be oriented at an angle (e.g. ranging from greater than 0 degrees)(° to less than 90°) relative to the axis along which the roller worm linearly translates, such that the axes are not oriented in parallel. The axes may be angled for manufacturing purposes and/or other considerations of a system (e.g., translation system) including the roller worm and the rack.

Referring to FIGS. 1A-1E and 3A-3C, views of exemplary helical drive systems 100a and 100b (collectively referred to herein as a helical drive system 100) including a roller worm 110 and an engagement structure 150 are illustrated. In some embodiments, the roller worm 110 can include a body portion 112. In some cases, the body portion 112 of the roller worm 110 may have a cylindrical (e.g., substantially cylindrical) structure including a first circular base portion 114, a second circular base portion 118, and a central body portion 116 connecting the first circular base portion 114 and the second circular base portion 118. As an example, the body portion 112 may have right cylindrical shape or an oblique cylindrical shape. In some cases, when the body portion 112 has a cylindrical structure, a diameter of the body portion 112 may be in the range of approximately 50 mm to 70 mm. While the body portion 112 is shown and described as having a cylindrical structure (e.g., substantially cylindrical) formed from the first circular base portion 114, the second circular base portion 118, and the central body portion 116, the body portion 112 may have an alternative structure such as an ellipsoid structure. In some cases, the roller worm 110 may be configured to rotate about a central axis 115. In some cases, the central axis 115 may extend through a center of each of the first circular base portion 114 and the second circular base portion 118. In some cases, a surface of the central body portion 116 may be oriented parallel (e.g., substantially parallel (to the central axis 115.

In some embodiments, the roller worm 110 may include a number of roller assemblies 130. For example, the roller worm 110 may include N number of roller assemblies 130, where N is any positive integer. In some cases, the roller assemblies 130 may have a cylindrical shape (e.g., substantially cylindrical shape). In other cases, the roller assemblies 130 may be conical-shaped roller assemblies or ellipsoid-shaped roller assemblies. Each of the roller assemblies 130 may be connected to the central body portion 116 of the roller worm 110. The roller assemblies 130 may extend from a surface of the central body portion 116 in one or more helical turns around the central body portion 116, such that the roller assemblies 130 form a helical (also referred to as "spiral") pattern about the central body portion 116. The roller assemblies 130 may extend from a surface of the central body portion 116 at an angle ranging from greater than 0° to less than 180° relative to the central axis 115. As an example, referring to the helical drive system 100a illustrated in FIGS. 1A-1E, a roller worm 110a may include a body portion 112a having roller assemblies 130a each extending along a respective central axis 148a orthogonally (90°) from a central body portion 116 of the body portion 112a relative to the central axis 115, where the roller assemblies 130a each include a roller element 134, an inner race 142a, and an outer race 146a rotationally coupled to the inner race 142a and fixedly combined with the roller element 134 as described further herein. In some cases, the roller assemblies 130 may only extend toward the first circular base portion 114 or a second circular base portion 118 at an angle relative to the central axis 115. As an example, referring to the helical drive system 100b illustrated in FIGS. 3A-3C, a roller worm 110b may include a body portion 112b having roller assemblies 130b each extending along a respective central axis 148b at angle that is not orthogonal (e.g., 70°) from a central body portion 116 of the body portion 112b relative to the central axis 115, where the roller assemblies 130b (i) are angled toward the first circular base portion 114, (ii) each include first and second inner races 142b, (iii) each include first and second outer races 146b, (iv) each include one or more roller bearing elements 144 disposed between the inner races 142b and the outer races 146b, where an outer race 146b is rotationally coupled to a respective inner race 142 via one or more of the roller bearing elements 144, and (v) each include a roller element 134 coupled to the exteriors of the first and second outer races 146b as described further herein. The roller worm 110b including roller assemblies 130b each extending at an angle that is not orthogonal relative to the central axis 115 may enable (i) use of larger diameter roller assemblies 130b relative to roller assemblies 130a used in a roller worm 110a and (ii) self-centering of the roller worm 110b during translation along the axis 172.

Figure 5:
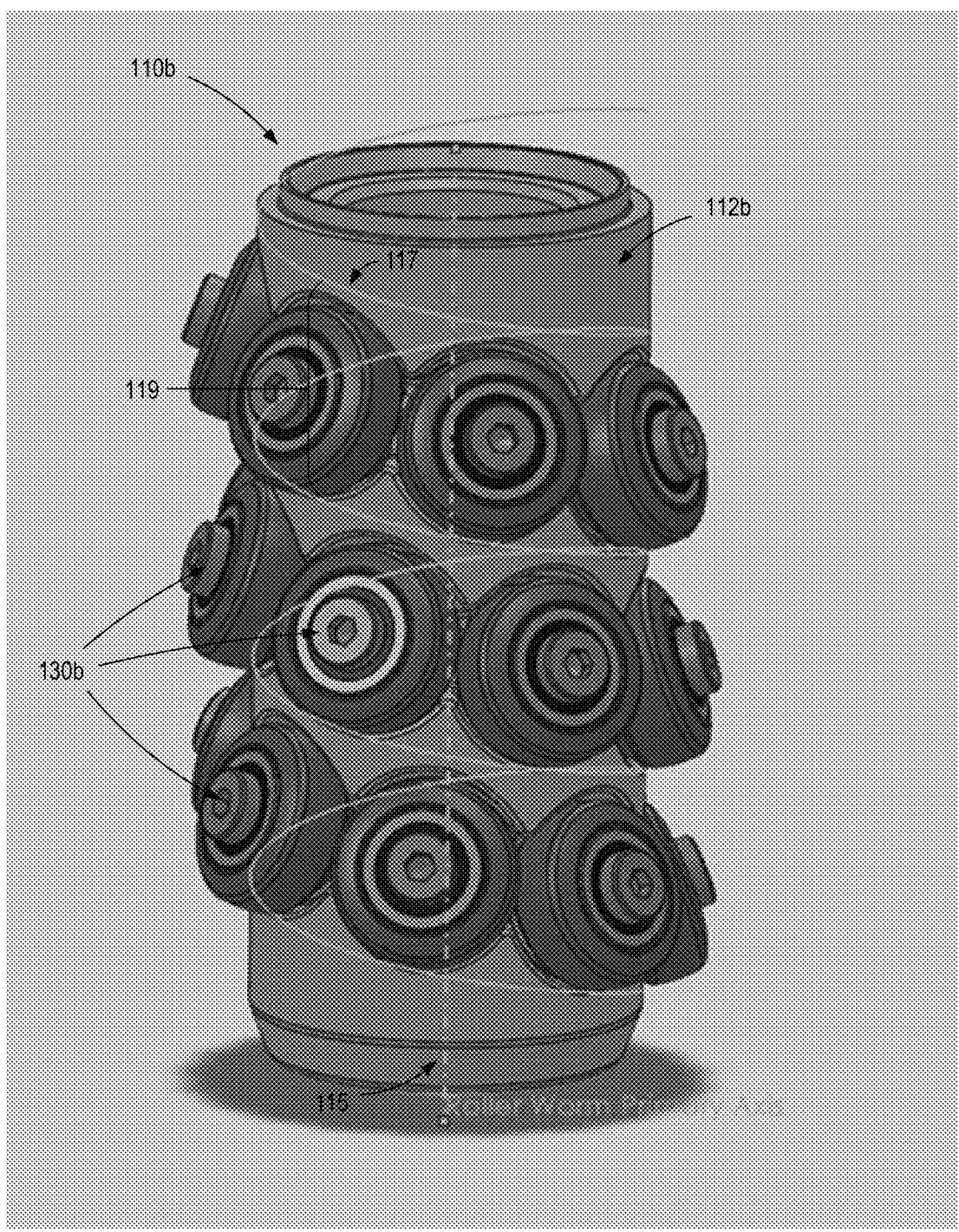
FIG. 5 illustrates a perspective view of an exemplary discrete roller assembly-based roller worm, according to some embodiments.

In some embodiments, the roller assemblies 130 may be disposed around the central body portion 116 in one or more helical turns having a selected (e.g., constant or variable) helical pitch. As an example, the roller assemblies 130 may be disposed around the central body portion 116 with a constant helical pitch of approximately 30 mm. A helical pitch of the one or more helical turns of the roller assemblies 130 may refer to a length between two adjacent positions on adjacent (e.g., consecutive) turns of the one or more helical turns along a central axis 115 of the roller worm 110. For example, a helical pitch may be equivalent to a length between a center of a first turn of the roller assemblies 130 and a center of a second turn of the roller assemblies 130, where the first turn and the second turn are adjacently positioned on the surface of the central body portion 116 and where an angular separation between the center of the first turn and the center of the second turn is 0° relative to a central axis 115 of the roller worm 110. In some cases, the roller assemblies 130 may have a selected helical pitch without the roller worm 110 including more than one helical turn of roller assemblies 130. Based on rotation of the roller worm 110 about the central axis 115, the roller assemblies 130 may rotate about a helical path 117 and a helical pitch of the roller assemblies 130 may be equivalent to a distance 119 between adjacent points on consecutive helical turns of the roller assemblies 130 along the helical path 117 as illustrated in FIGS. 1B and 5. In some cases, the roller assemblies 130 may be evenly spaced or variably spaced along the helical path 117 on the body portion 112 of the roller worm 110. As an example, the roller assemblies 130 may be evenly spaced along the central body portion 116, such that each roller assembly 130 is a selected distance from another adjacent roller assembly 130. As another example, the roller assemblies 130 may be variably spaced along the central body portion 116, such that distances between adjacent roller assemblies 130 are not equivalent.

In some embodiments, a diameter of each of the roller assemblies 130, a number of the roller assemblies 130 included in the roller worm 110, and/or a helical pitch of the roller assemblies 130 may be selected based on a diameter of the body portion 112 of the roller worm 110. As an example, for the roller worm 110, a ratio of a helical pitch of the roller assemblies 130 and a diameter of the body portion 112 may range from approximately 0.3 to 3.2 and may preferably be 0.6 (e.g., based on a ratio of a 30 mm helical pitch of the roller assemblies 130 and a 50 mm diameter of the body portion 112). As another example, a ratio of a diameter of each of the roller assemblies 130 and a diameter of the body portion 112 may range from approximately 0.2 to 0.6 and may preferably be 0.45 (e.g., based on a ratio of a 32 mm diameter of the roller assemblies 130 and a 70 mm diameter of the body portion 112).

In some embodiments, the roller assemblies 130 may be cam follower bearings (e.g., such as stud-mounted track rollers), deep groove ball bearings, or an alternative roller assembly. Each of the roller assemblies 130 may include a roller element 134 (e.g., having a cylindrical shape, crowned shape, conical shape, or ellipsoid shape) on an exterior of the roller assembly 130 to provide an interfacial surface between the roller worm 110 and an engagement structure 150. The roller element 134 may be fixedly coupled to the roller assembly 130 or rotationally coupled to the roller assembly 130 (e.g., such that the roller element 134 rotates about a central axis 148 of the roller assembly 130). Use of a roller element 134 that is configured to rotate about a central axis 148 can provide the advantage of reducing friction between the roller assembly 130 and the contact surfaces 162 of the engagement structure. In some cases, the roller element 134 may rotate about a central axis 148 of the roller assembly 130 and may contact the engagement structure 150 during translation of the roller worm 110 along the engagement structure 150. Each of the roller assemblies 130 may be made of and/or include one or more materials. For example, a roller assembly 130 may be made of and/or include a combination of engineering materials. In some cases, the central portion 141 may be made of and/or include steel and/or aluminum. In some cases, for a particular roller assembly 130, the inner race 142, the roller bearing element(s) 144, and/or the outer race 146 may be made of and/or include hardened steel, ceramic, plastic, and/or other engineering materials with suitable durability for engaging with the engagement structure 150 and enabling rotation of the outer race 146 and/or the roller element 134. In some cases, each of the roller assemblies 130 may have a diameter in the range of approximately 16 mm to 32 mm. In some cases, the roller assemblies 130 may be removably coupled to the body portion 112 by a central portion 141. For example, central portions 141 of the roller assemblies 130 may each be screwed into respective cavities (e.g., bores or holes) extending into the body portion 112 of the roller worm 110, such that the roller assemblies 130 are arranged in one or more helical turns around the body portion 112. In some cases, each of the roller assemblies 130 can include at least one inner race 142 coupled to the central portion 141, at least one outer race rotationally coupled to the at least one inner race 142, one or more roller bearing elements 144 that rotationally couple the at least one inner race 142 to the at least one outer race 146, and/or a roller element 134 coupled to an exterior of the outer race 146. In some cases, for a roller assembly 130, the outer race 146 may be combined with the roller element 134. For example, as illustrated in FIG. 1E, the outer race 146a is combined with the roller element 134, where both the roller element 134 and outer race 146a are configured to rotate about the central axis 148a.

Figure 3A:
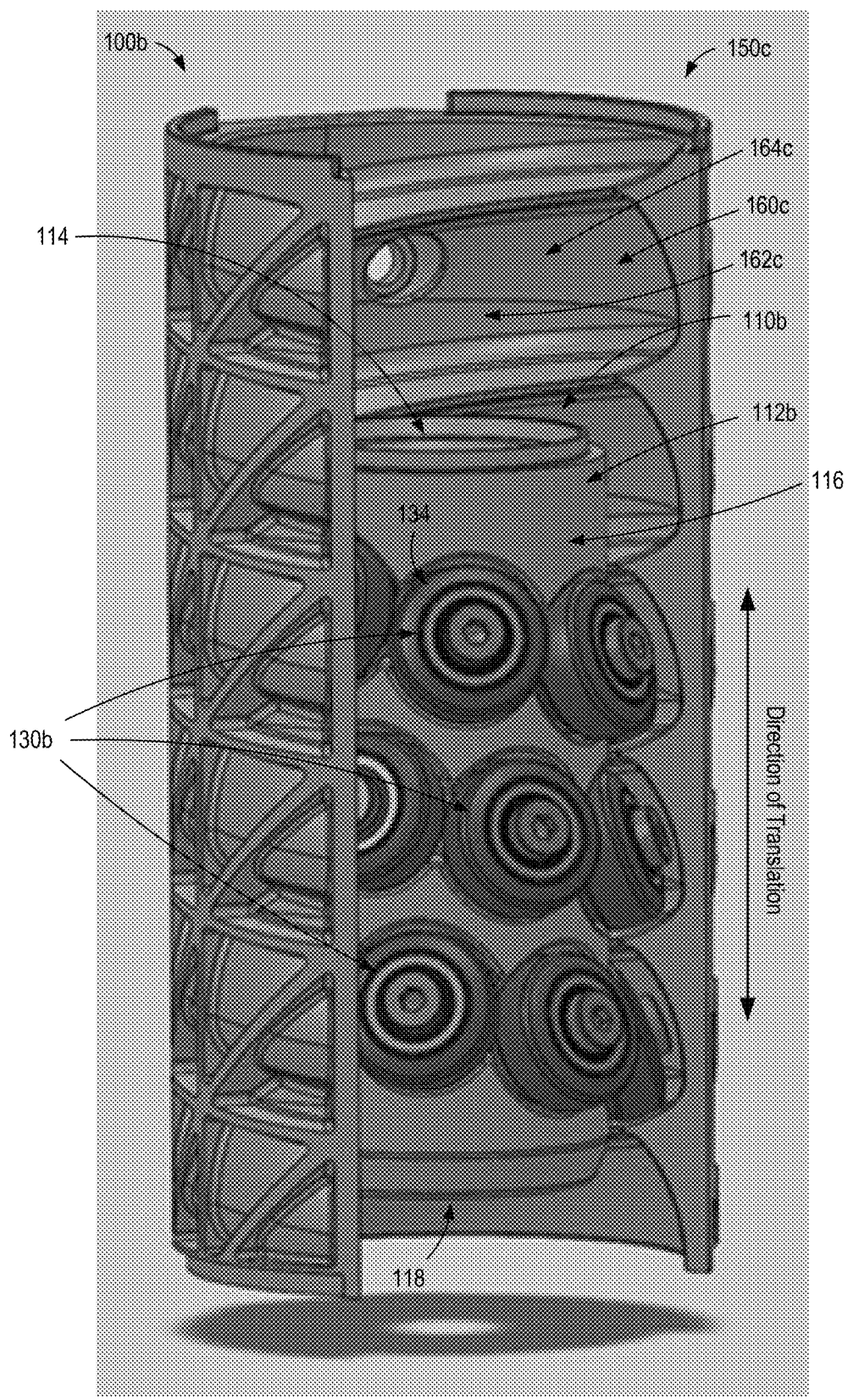
FIG. 3A illustrates a first perspective view of an exemplary discrete roller assembly-based helical drive including an exemplary roller worm and an exemplary engagement structure, according to some embodiments.
Figure 3B:
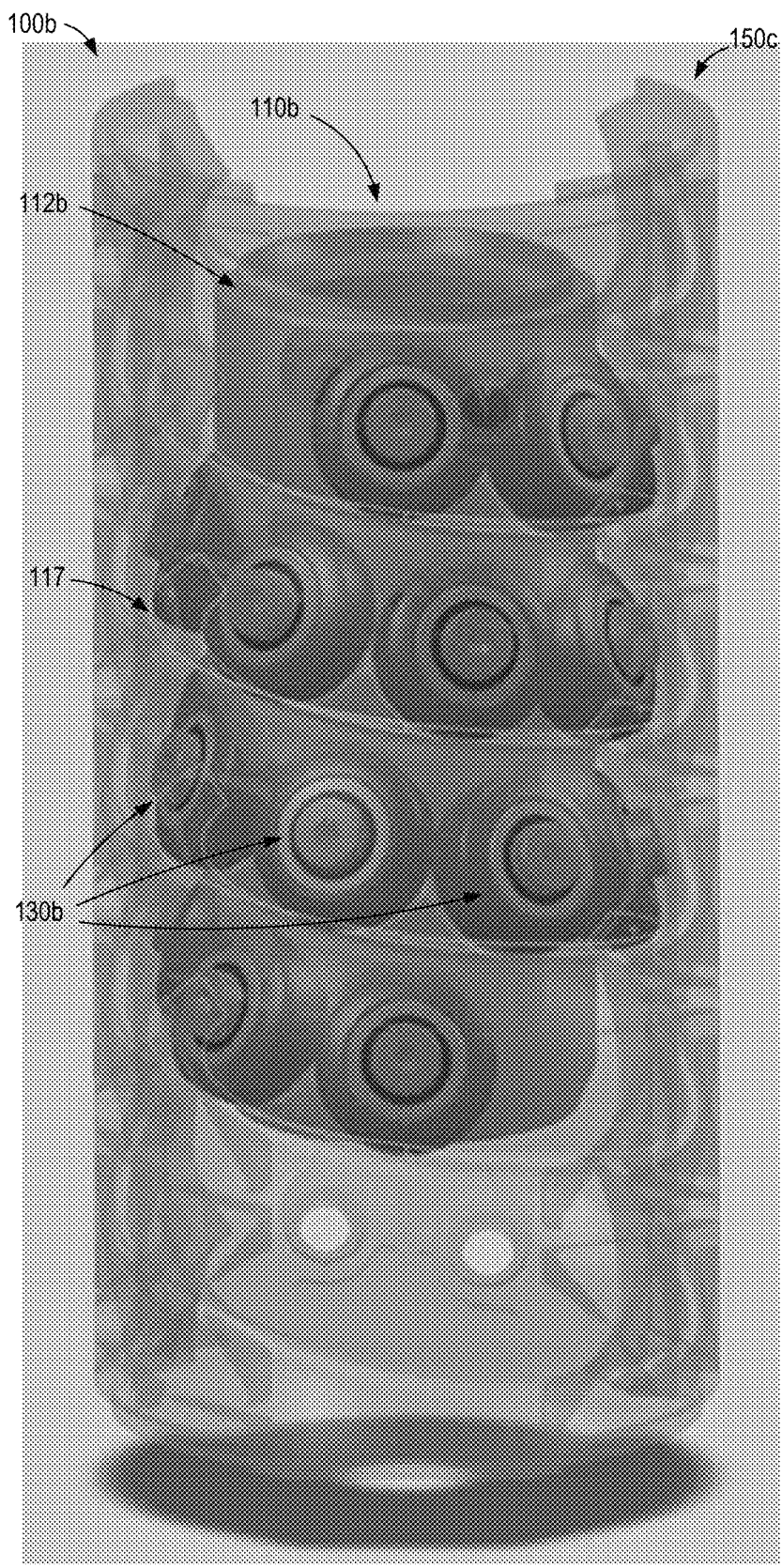
FIG. 3B illustrates a second perspective view of an exemplary discrete roller assembly-based helical drive including an exemplary roller worm and an exemplary engagement structure, according to some embodiments.
Figure 3C:
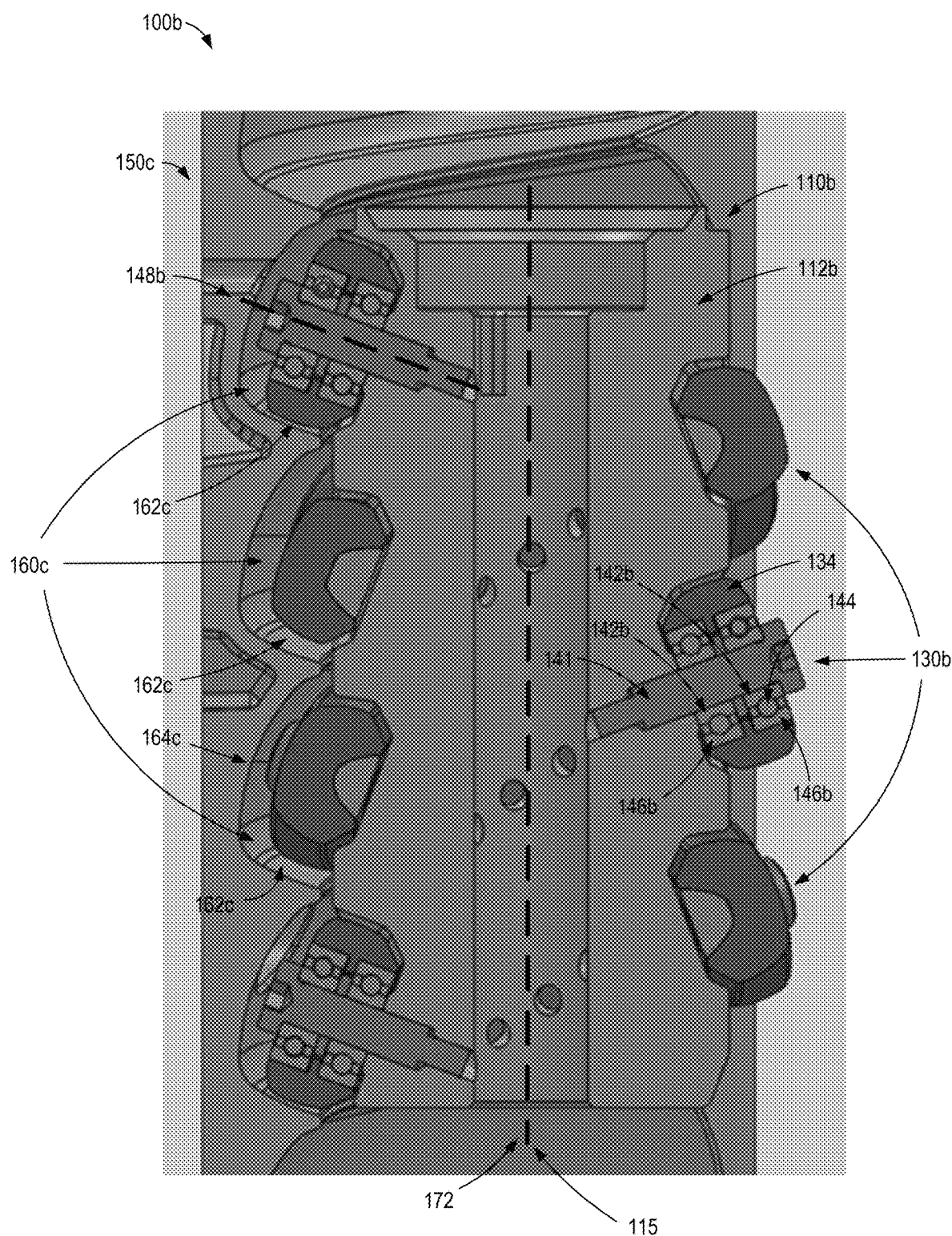
FIG. 3C illustrates a cross-sectional view of an exemplary discrete roller assembly-based helical drive including an exemplary roller worm and an exemplary engagement structure, according to some embodiments.

In some cases, for each roller assembly 130 including an outer race 146, the inner race 142 may be rotationally coupled to the outer race 146, such that the outer race 146 and connected roller element 134 are configured to rotate about the central axis 148 via the inner race 142. In some cases, for each roller assembly 130, the outer race 146 and connected roller element 134 may rotate about a central axis 148 of the roller assembly 130 while the central portion 141 and inner race 142 remains fixed to the body portion 112 of the roller worm 110. For example, as illustrated in FIG. 3C, the roller element 134 is connected to exteriors of a pair of outer races 146b, where the outer races 146 are rotationally coupled to a pair of inner races 142b via one or more roller bearing elements 144, where both the roller element 134 and outer races 146b are configured to rotate about the central axis 148b. For each roller assembly 130, a central axis 148 of the roller assembly 130 about which the roller element 134 is configured to rotate may be collinear with an axis by which the roller assembly 130 extends from a surface of the central body portion 116 of the roller worm 110, where the roller assembly 130 extends from the surface of the central body portion 116 at an angle relative to the central axis 115 of the roller worm 110. Such rotation may reduce friction between the roller assembly 130 and a contact surface 162 of an engagement structure 150.

In some embodiments, the helical drive system 100 may include an engagement structure 150. In some cases, the engagement structure 150 may be a linear rack or a linear frame along which the roller worm 110 may linearly translate via rotation about the central axis 115 of the roller worm 110. When the roller worm 110 rotates about the central axis 115, contact (e.g., engagement) between the roller assemblies 130 and the engagement structure 150 may apply a linear thrust force to the roller worm 110, thereby causing the roller worm 110 to linearly translate along an axis 172 (also referred to as a "primary axis 172") of the engagement structure 150. Based on a direction of rotation (e.g., clockwise or counterclockwise) of the roller worm 110 and an orientation of the helical pattern of the roller assemblies 130, the roller worm 110 may translate (e.g., linearly translate) in a first direction or second directions (e.g., forward or backward, left or right, or upward or downward) along a length of the engagement structure 150, where the first direction is opposite the second direction. In some cases, as illustrated in the FIGS. 1B, 1E and 3C, the central axis 115 about which the roller worm 110 rotates may be parallel to and collinear with the axis 172. In other cases, as illustrated in FIG. 1C, the central axis 115 about which the roller worm 110 rotates may not be parallel to the axis 172, such that the central axis 115 may be oriented at an angle relative to the axis 172 (e.g. ranging from greater than 0° to less than 90°).

In some embodiments, translation of the roller worm 110 may occur in a three-dimensional (3D) environment, where the axis 172 corresponds to any suitable axis along any axis (e.g., +/−, X, Y, Z). The engagement structure 150 may include a number of tracks 160 configured to receive and/or or engage with the roller assemblies 130 of the roller worm 110. For example, the engagement structure 150 may include M number of tracks 160, where M is any positive integer. In some cases, each track 160 can include at least one complementary, contact surface 162 to the helical path 117 traveled by the roller assemblies 130 during rotation of the roller worm 110, where each contact surface 162 is configured to contact the roller elements 134 of each of the roller assemblies 130 of the roller worm 110 during translation of roller worm 110 along the engagement structure 150. In some cases, each track 160 may include a concave structure (e.g., indentation) included in the engagement structure 150, where the concave structure includes at least one contact surface 162 and a distal end wall 164. A concave structure of a track 160 may be complementary with a geometry of the roller assemblies 130 and included roller elements 134 relative to the roller worm 110, such that the concave structure is configured to receive the roller assemblies 130. In some cases, the tracks 160 may be evenly spaced or variably spaced along the axis 172 and a length of the engagement structure 150. As an example, the tracks 160 and included contact surfaces 162 may be evenly spaced along the axis 172 and the length of the engagement structure 150, where a distance between centers of adjacent tracks 160 is based on (e.g., equivalent to) the helical pitch of the roller assemblies 130 of the roller worm 110. As another example, the tracks 160 and included contact surfaces 162 may be variably spaced along the axis 172 and the length of the engagement structure 150, where a distance between centers of adjacent tracks 160 is based on (e.g., equivalent to) the distances between adjacent roller assemblies 130 of the roller worm 110.

In some embodiments, during angular rotation of a roller assembly 130, the roller assembly 130 may engage with a track 160 (e.g., via contact with a contact surface 162 or entry into an indentation formed by the track 160) for a particular angular sweep (e.g., ranging from 0° to 360°) based on a geometry of the track 160. Accordingly, each track 160 may have a respective geometry configured to clear a particular angle swept by a roller assembly 130 as the roller assembly travels along the helical path 117 defined by rotation of the roller worm 110, where the angular sweep is defined relative to the axis 172. In some cases, each track 160 and included contact surface(s) 162 may have an angular sweep ranging from 30° to 350° (e.g., preferably 270°), where the angular sweep is greater than an angular spacing between adjacent roller assemblies 130 of the roller worm 110. As an example, tracks 160a and 160b of the engagement structures 150a and 150b illustrated in FIGS. 1A-1E, respectively, may have an angular sweep of less than 180°. As another example, a track 160c of the engagement structure 150c illustrated in FIGS. 3A-3C may have angular sweep of greater than 180°.

Figure 4:
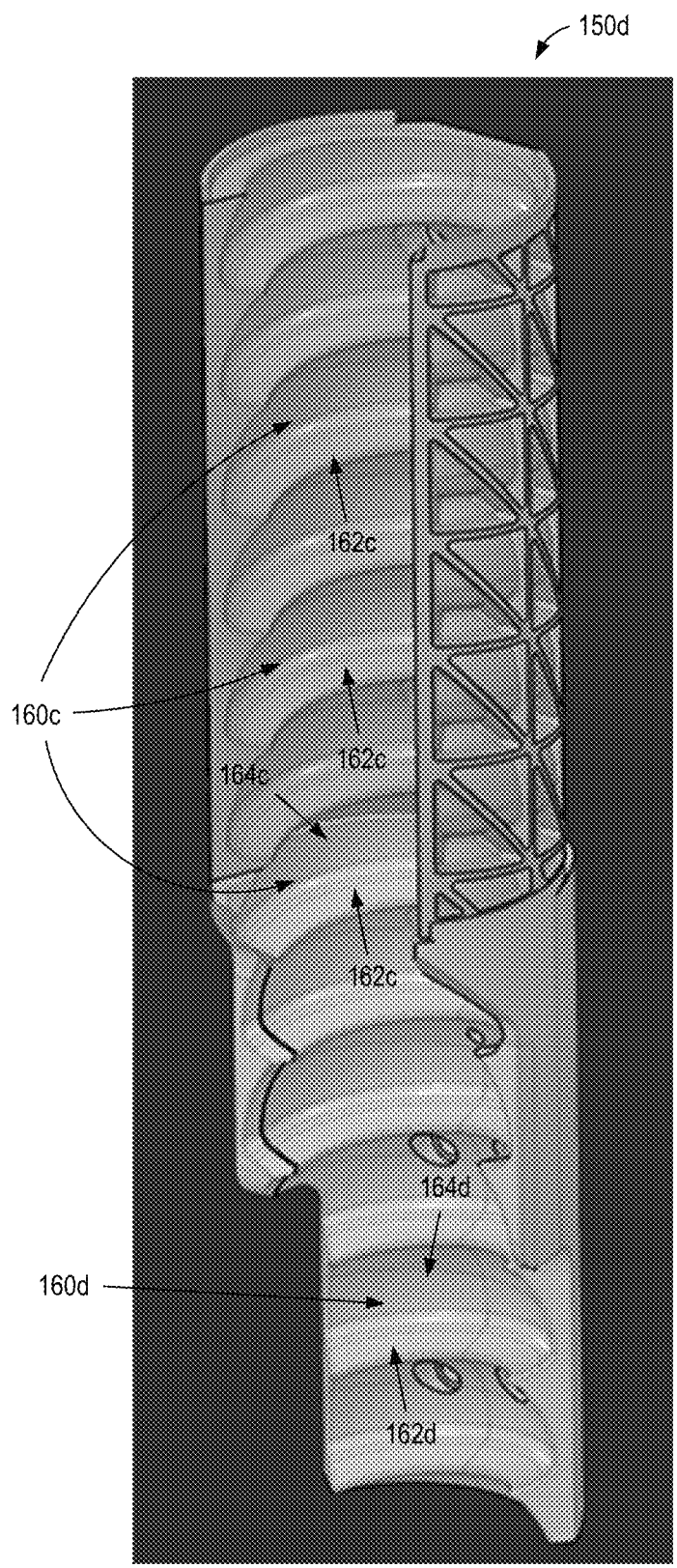
FIG. 4 illustrates a perspective view of an exemplary engagement structure, according to some embodiments.

In some embodiments, an engagement structure 150 may include tracks 160 having varying swept angles of contact surfaces 162 (e.g., to achieve different operating requirements for the helical drive system 100). For example, referring to the engagement structure 150d illustrated in FIG. 4, the tracks 160c including contact surfaces 162c may include an angular sweep greater than an angular sweep of the tracks 160d including the contact surface 162d. An engagement structure 150 including a track 160 and a contact surface 162 having a swept angle greater than 180° (e.g., half a full rotation of the roller worm 110) may be used to contain and guide the roller worm 110 along the axis 172. An engagement structure 150 including a track 160 and a contact surface 162 having a swept angle less than 180° may allow engagement and disengagement of the roller worm 110 from the engagement structure 150. In some cases, a particular track 160 may receive and/or contact one or more roller assemblies 130 (e.g. adjacent roller assemblies 130) at a point in time based on a size of the roller assemblies 130, a helical pitch of the roller assemblies 130, a distance (e.g., spacing) between adjacent roller assemblies 130, and/or an angular sweep of each of the tracks 160.

Figure 1B:
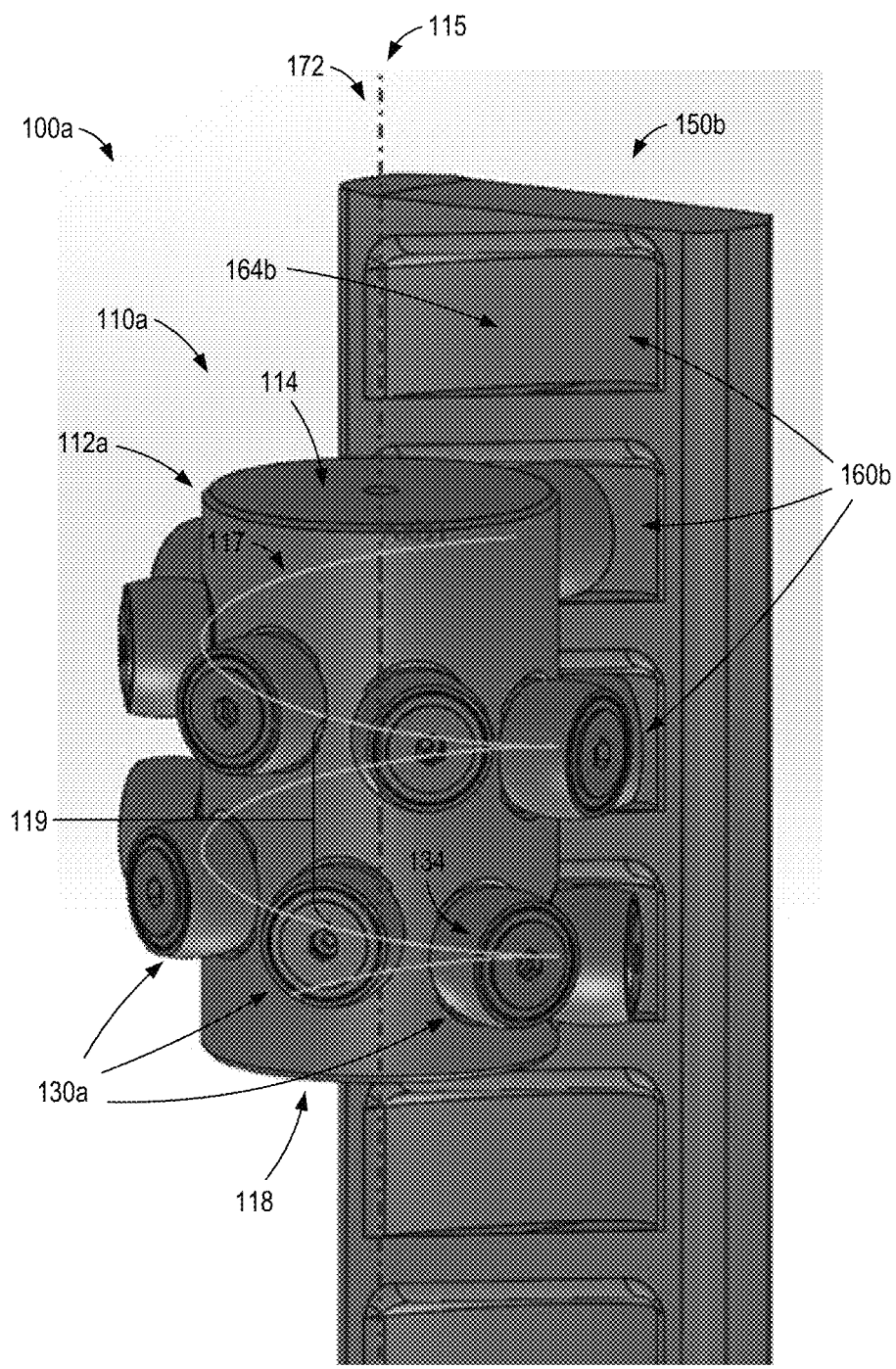
FIG. 1B illustrates a second perspective view of an exemplary discrete roller assembly-based helical drive including an exemplary roller worm and an exemplary engagement structure, according to some embodiments.
Figure 1C:
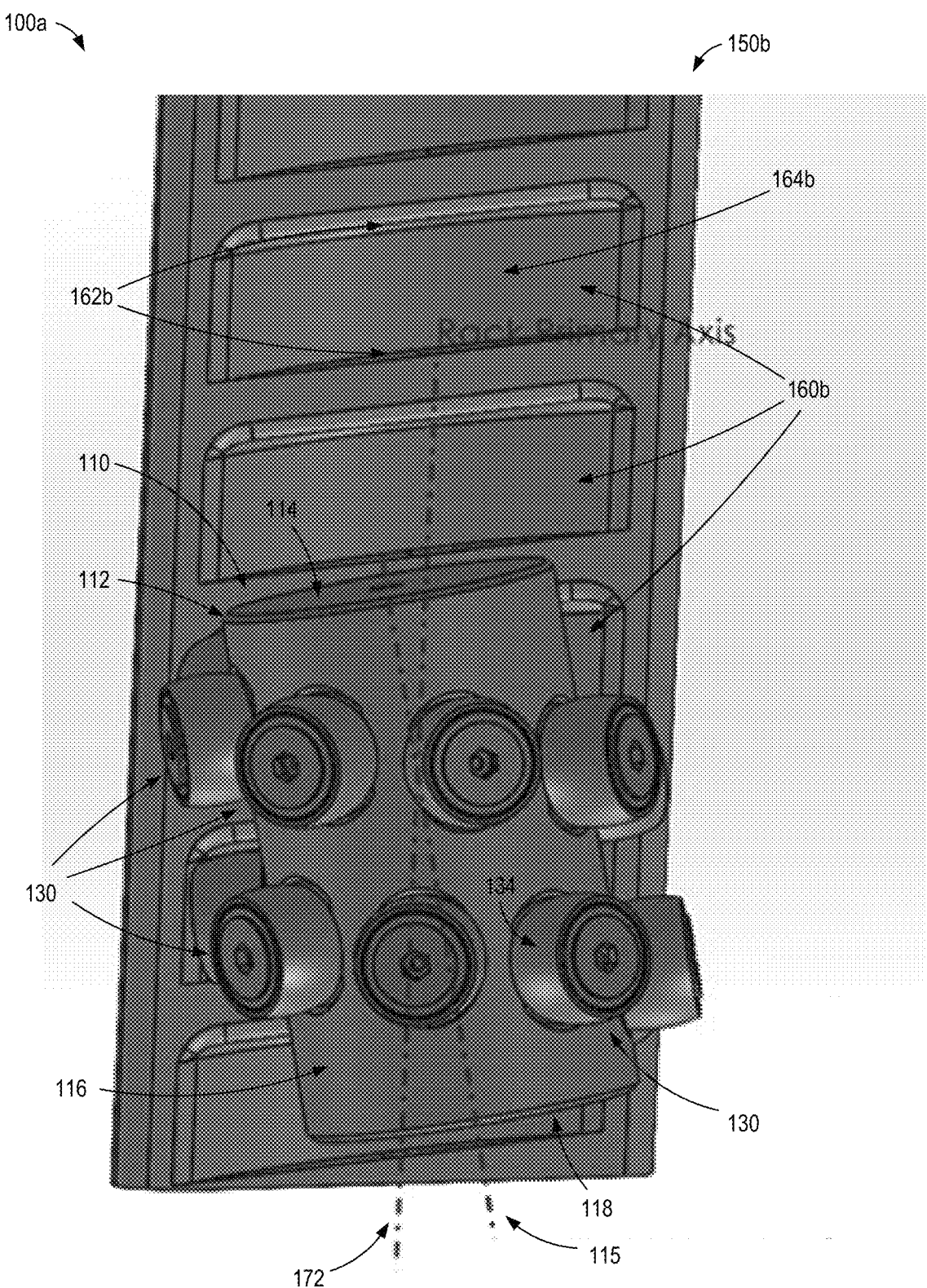
FIG. 1C illustrates a third perspective view of an exemplary discrete roller assembly-based helical drive including an exemplary roller worm and an exemplary engagement structure, according to some embodiments.
Figure 1D:
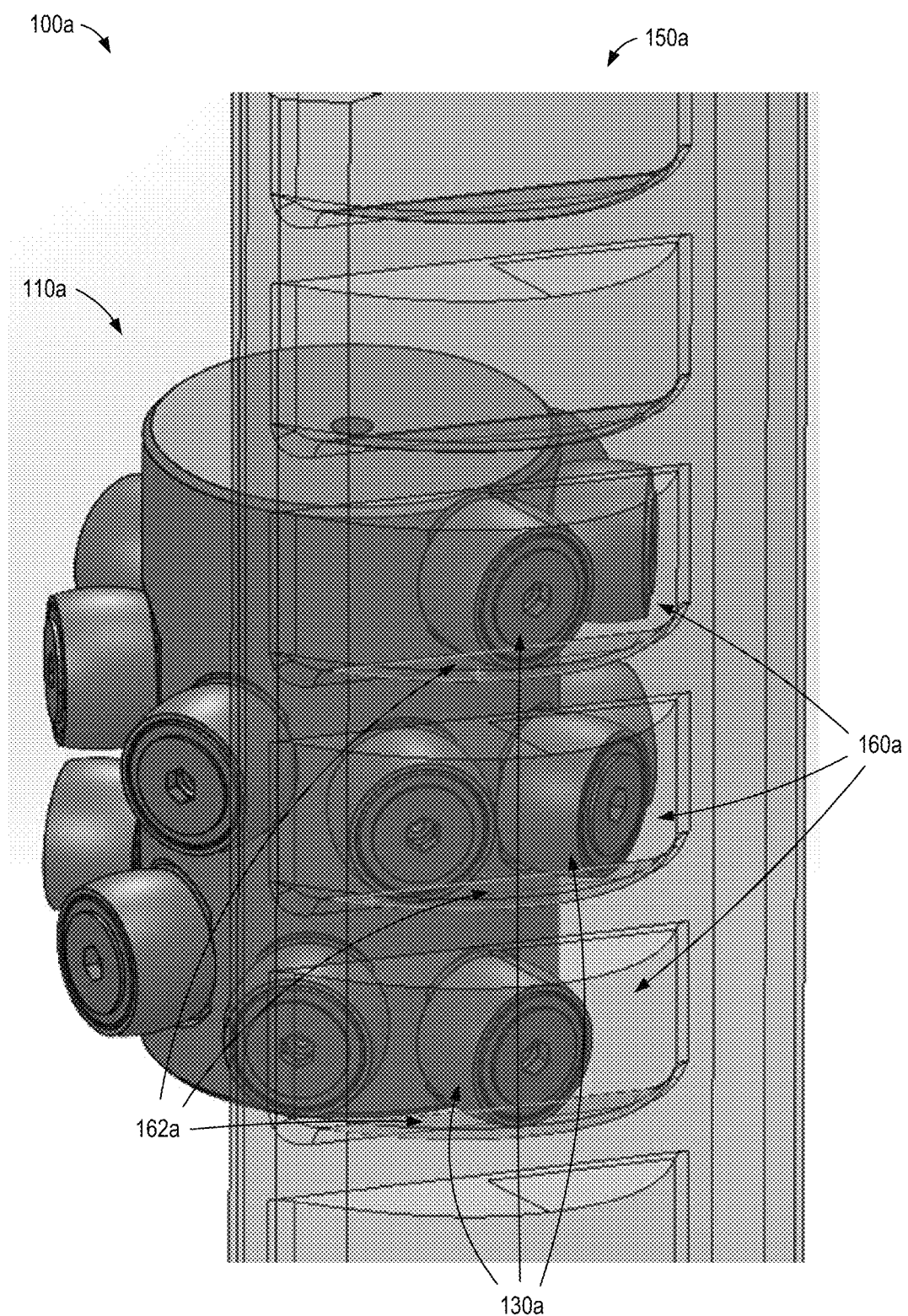
FIG. 1D illustrates a fourth perspective view of an exemplary discrete roller assembly-based helical drive including an exemplary roller worm and an exemplary engagement structure, according to some embodiments.
Figure 1E:
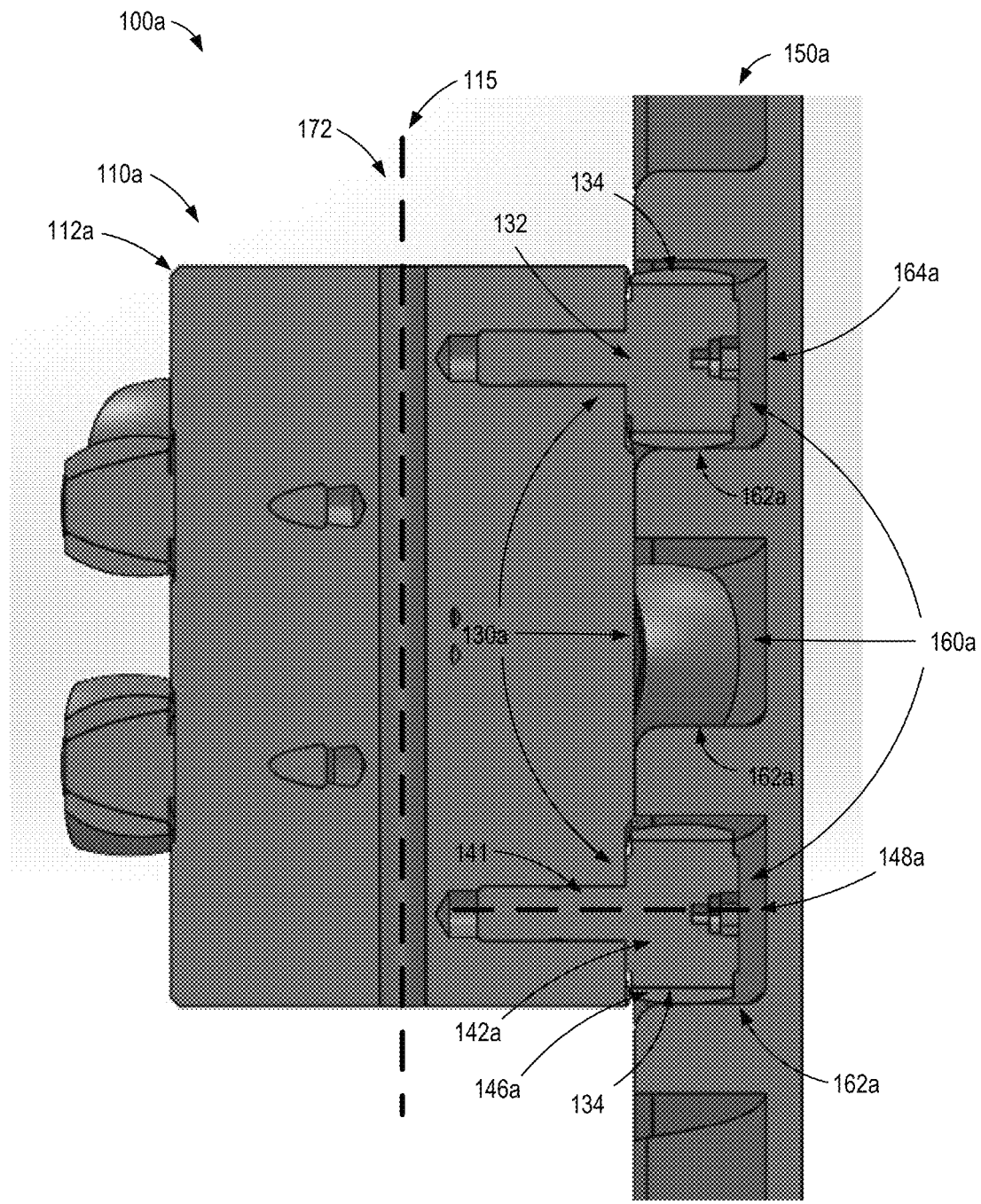
FIG. 1E illustrates a cross-sectional view of an exemplary discrete roller assembly-based helical drive including an exemplary roller worm and an exemplary engagement structure, according to some embodiments.

In some embodiments, as described herein and illustrated in FIGS. 1A-1E, the engagement structure 150 may include a number of tracks 160 configured to receive the roller assemblies 130. Each track 160 can include at least one contact surface 162 configured to engage with and contact (e.g., the roller elements 134 of the roller assemblies 130) the roller assemblies 130 of the roller worm 110. In some cases, a track 160 may include (ii) only one contact surface 162 on a first side of a distal end wall 164 or (ii) a first contact surface 162 on a first side of a distal end wall 164 and a second contact surface 162 on a second side of the distal end wall 164, where the first side opposes the second side. As an example, as illustrated in FIGS. 1A and 1D-1E, the tracks 160a of the engagement structure 150a may each include a single contact surface 162a configured to engage with a first side of a roller element 134 of a roller assembly 130 of the roller worm 110. As another example, as illustrated in FIGS. 1B-1C, the tracks 160b of the engagement structure 150b may each include a pair of contact surfaces 162b on opposing interior sides of the track 160b separated by the distal end wall 164 and configured to engage with and contact first and second sides of a roller element 134 of a roller assembly 130 of the roller worm 110, where the contact surfaces 162b are positioned in parallel and where the first side of the a roller element 134 opposes the second side of the a roller element 134.

Figure 2:
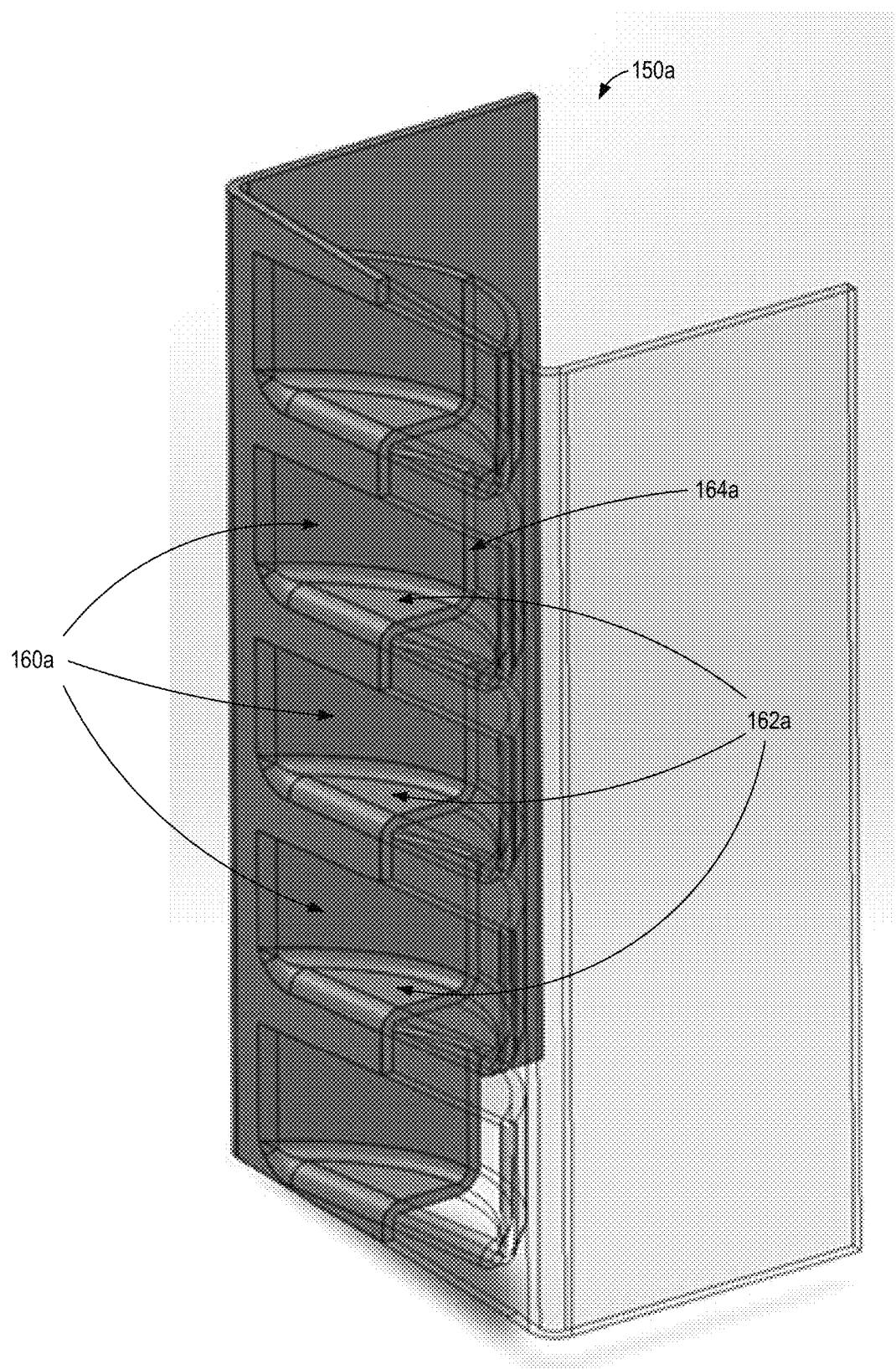
FIG. 2 illustrates a perspective view of an exemplary engagement structure, according to some embodiments.

Referring to FIG. 2, an embodiment of the engagement structure 150a included in the helical drive system 100a is illustrated. For a use case of at least partially vertically translating (e.g., lifting) the roller worm 110 along the axis 172 and the length of the engagement structure 150a (e.g., against gravity), only a single contact surface 162a may be needed in each track 160a as illustrated in FIG. 2, as a lifting force acting on the roller worm 110 may only act in a direction resisting gravity (e.g., orthogonal to the contact surface 162a and/or parallel to the axis 172). In some cases, an engagement structure 150a may include only a single contact surface 162a per track 160a to (i) reduce cost and/or (ii) enable alternate methods for designing geometry with which the roller worm 110 and included roller assemblies 130 engage with the engagement structure 150a.

In some embodiments, each track 160 and included contact surface(s) 162 may be oriented at an angle ranging from greater than 0° to less than 180° relative to the axis 172 along which the roller worm 110 translates. As an example, referring to the engagement structures 150a and 150b as illustrated in FIGS. 1A-1E and 2, the tracks 160a and 160b, included contact surfaces 162a and 162b, and included distal end walls 164a and 164b, respectively, may be oriented orthogonally (90°) relative to the axis 172 along which the roller worm 110 translates. As another example, referring to the engagement structures 150c and 150d as illustrated in FIGS. 3A-3C and 4, respectively, each track (e.g., tracks 160c and 160d) and included contact surface(s) (e.g., contact surfaces 162c and 162d) and distal end walls (e.g., distal end walls 164c and 164d) may be helically oriented at an angle less than 90° or greater than 90° relative to the axis 172. Orienting the tracks 160 and included contact surfaces 162 at an angle less than 90° or greater than 90° relative to the axis 172 may provide an advantage of providing a centering geometry between the roller worm 110 and the engagement structure 150. In some cases, when the central axis 115 and the axis 172 are parallel, an offset distance can form between the central axis 115 and the axis 172 (e.g., such that the central axis 115 and the axis 172 are not collinear). When the tracks 160 are oriented at an angle less than 90° or greater than 90° relative to the axis 172, the non-perpendicular angle of each of the tracks 160 relative to the axis 172 can cause (i) contact between the track 160 and exteriors (e.g., the roller elements 134) of the roller assemblies 130 in the direction of the offset distance and (ii) formation of a gap distance between the tracks 160 and exteriors of roller assemblies 130 oriented in a direction other than the direction of the offset distance. Based on the engagement structure 150 applying a force to the roller worm 110 that is normal to the contact surfaces 162 at the contact points between the roller worm 110 and engagement structure 150, a first component of the force can act (e.g., upwards) on the roller worm 110 along the axis 172 and a second component of the force can act laterally on the roller worm 110 (e.g., in directions orthogonal to the axis 172), thereby providing a centering force to return the central axis 115 to the axis 172 and reduce and/or eliminate the offset distance. A third component of the force may act orthogonally to the first and second components of the force based on the angle of the contact surface 162 with respect to the helical pattern of the roller assemblies 130 and the helical path 117. The resultant of the first, second, and third components of the force can be a single vector directed normal to the contact surface 162. When the tracks 160 and included contact surface(s) 162 are helically oriented at an angle less than 90° or greater than 90° relative to the axis 172, a pitch of the tracks may be based on (e.g., equivalent to) a pitch of the roller assemblies 130 (e.g., as illustrated in FIGS. 3A-3C and 4).

In some embodiments, as described herein, the roller assemblies 130 may extend from a surface of the central body portion 116 at along a central axis 148 at an angle ranging from greater than 0° to less than 180° relative to the central axis 115 of the roller worm 110. Accordingly, the engagement structure 150 may include tracks 160 and contact surfaces 162 that are complementary to a shape and/or an orientation of the roller assemblies 130. The engagement structure 150 may be configured to (i) receive the roller assemblies 130 at an angle at which the roller assemblies 130 extend from the roller worm 110 relative to the central axis 115 and/or (ii) accommodate travel of the roller worm 110 and included roller assemblies 130 along the axis 172. In some cases, the angle at which the tracks 160 receive the roller assemblies 130 may not be parallel to the angle at which the roller assemblies 130 extend from the roller worm 110 relative to the central axis 115 based on shapes of the exteriors (e.g., roller elements 134) of the roller assemblies 130. For example, when the roller assemblies 130 each include an roller element 134 having a conical shape, the tracks 160 may each have an angle relative to the central axis 115, where the angle is a sum of the angle of the roller assemblies 130 and a taper angle of the conical shape of the roller element 134. In some cases, each track 160 and included contact surface(s) 162 may oriented at an angle ranging from greater than 0° to less than 180° relative to the axis 172 along which the roller worm 110 translates, thereby enabling the track 160 to be oriented in parallel with the angle at which the roller assemblies 130 extend from the roller worm 110 relative to the central axis 115. As an example, referring to the engagement structure 150a as illustrated in FIGS. 1E, the tracks 160a and included contact surfaces 162a may be oriented (i) orthogonal (90°) relative to the axis 172 along which the roller worm 110a translates and (ii) parallel to the angle at which the roller assemblies 130a extend from the roller worm 110a relative to the central axis 115. As another example, referring to the engagement structure 150c as illustrated in FIG. 3C, the tracks 160c and included contact surfaces 162c may be oriented (i) at an angle greater than 0° and less than 90° or greater than 90° and less than 180° relative to the axis 172 which the roller worm 110b translates and (ii) parallel to the angle at which the roller assemblies 130b extend from the roller worm 110b relative to the central axis 115.

In some embodiments, an engagement structure 150 may be manufactured by stamping engagement structure 150 to form each track 160 and included contact surface(s) 162 and distal end wall 154. For example, for an engagement structure 150a including a single contact surface 162a per track 160a as illustrated in FIG. 2, the contact surface 162a of each track 160a may be fabricated by stamping a preform (e.g., made of and/or including sheet metal such as steel) to form the engagement structure 150a and included contact surfaces 162a. Such a fabrication technique for forming contact surfaces 162 on the engagement structure 150 may be optimized for cost and scalability. In some case, the tracks 160 and contact surfaces 162 along which the roller worm 110 translates may be formed by other manufacturing techniques such as cutting or injection molding.

In some embodiments, referring again to FIGS. 1A-1E and 3A-3C, each roller assembly 130 (e.g., the roller element 134 of each roller assembly 130) may include crowning. Crowning included on the roller element 134 on the exterior of each roller assembly 130 may be (i) an interfacial surface between the roller assembly 130 and a contact surface 162 of the engagement structure 150 and (ii) configured to modify a location of a point of contact between each roller assembly 130 and the engagement structure 150. When the roller assemblies 130 include crowning or on the roller elements 134, during rotation of the roller worm 110 along the engagement structure 150, a secondary radius of each of the crowned roller elements 134 (e.g., a crowning radius perpendicular to the radius of the roller assembly 130) can provide a line of contact as the roller worm 110 rotates and sweeps each crowned roller element 134 along the helical path 117 across the surface of the engagement structure 150. In some cases, additionally or alternatively, the roller element 134 may be a conical shaped object or ellipsoid shaped object to account for the helical path 117 of motion of the roller worm 110 across the surface of the engagement structure 150. In some cases, the contact surfaces 162 of the tracks 160 may have a shape that is complementary to a shape of exteriors of the roller assemblies 130 (e.g., roller elements 134 of the roller assemblies 130).

In some embodiments, each helical turn (e.g., revolution) of roller assemblies 130 around the central body portion 116 of the body portion 112 may include a number of roller assemblies 130 in a range of six to sixteen roller assemblies 130. In some cases, each turn of the roller assemblies 130 around the central body portion 116 may preferably include at least eight roller assemblies 130, such that each of at least eight roller assemblies 130 engage with a track 160 of the engagement structure 150 during a single revolution of the roller worm 110 along the helical path 117. At least one of the roller assemblies 130 of the roller worm 110 may be in contact with a contact surface 162 the engagement structure 150 during rotation of the roller worm 110 at any given time, such that at least part of the roller worm 110 is in continuous contact with the engagement structure 150. In some cases, each turn of roller assemblies 130 around the central body portion 116 may include a non-integer number of roller assemblies 130. For example, when the roller assemblies are evenly spaced, a first turn of roller assemblies 130 disposed about the central body portion 116 in a helical pattern may include 8.5 roller assemblies 130, such that a second turn of roller assemblies 130 adjacent to the first turn of roller assemblies 130 shares half of a same roller assembly 130 with the first turn of roller assemblies 130. Such a non-integer number of roller assemblies 130 per turn may be used to offset engagement and disengagement of individual roller assemblies 130 with the engagement structure 150. A non-integer number of roller assemblies 130 per turn may be used to (i) reduce the swept angle of the tracks 160 of the engagement structure 150 and (ii) retain multiple points of contact between the roller worm 110 and the engagement structure 150 by reducing an angular separation (e.g., relative to a central axis 115) between adjacent roller assemblies 130.

Figure 6A:
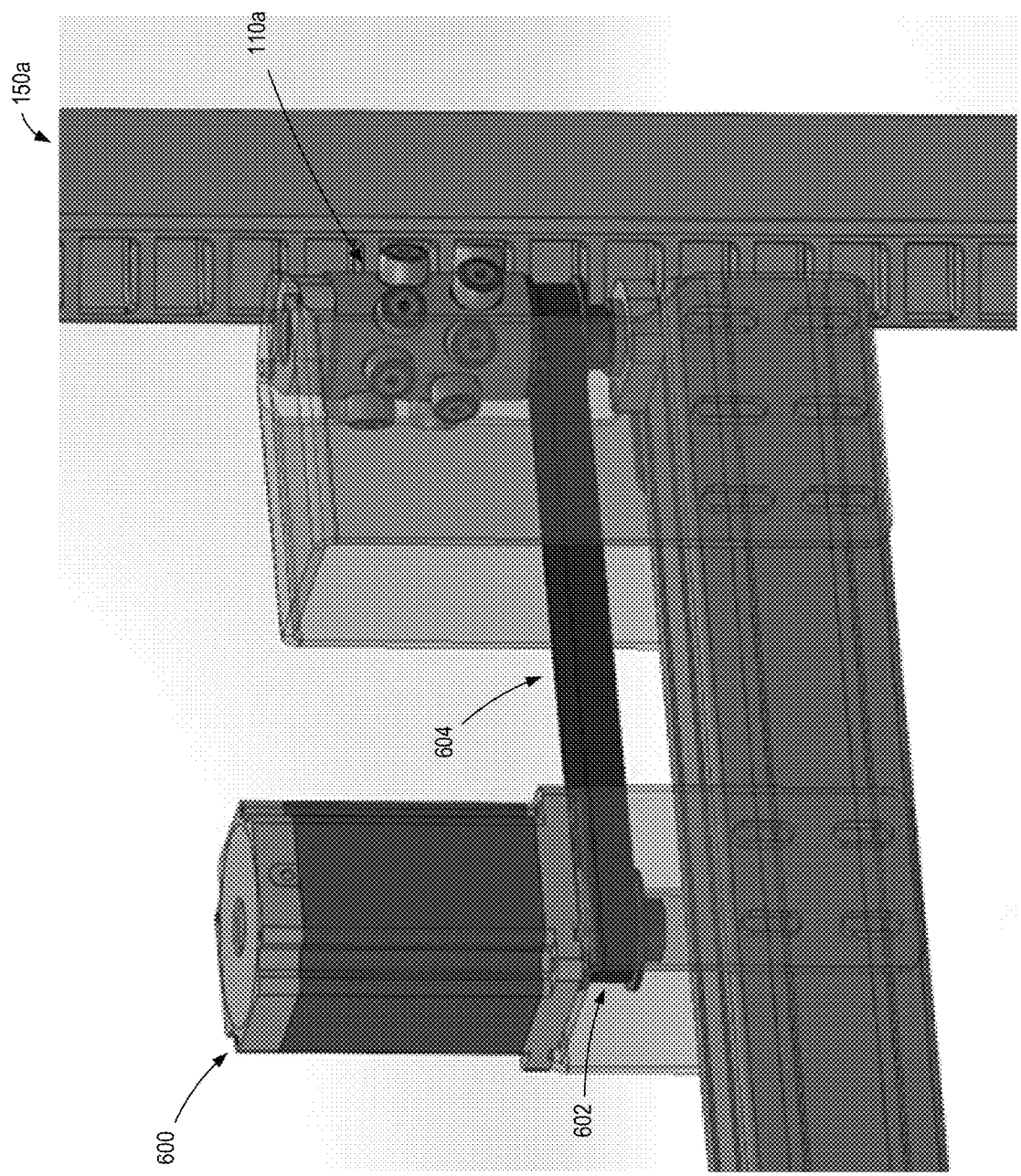
FIG. 6A illustrates a perspective view of an exemplary drive component and an exemplary helical drive including an exemplary roller worm and an exemplary engagement structure, according to some embodiments.
Figure 6B:
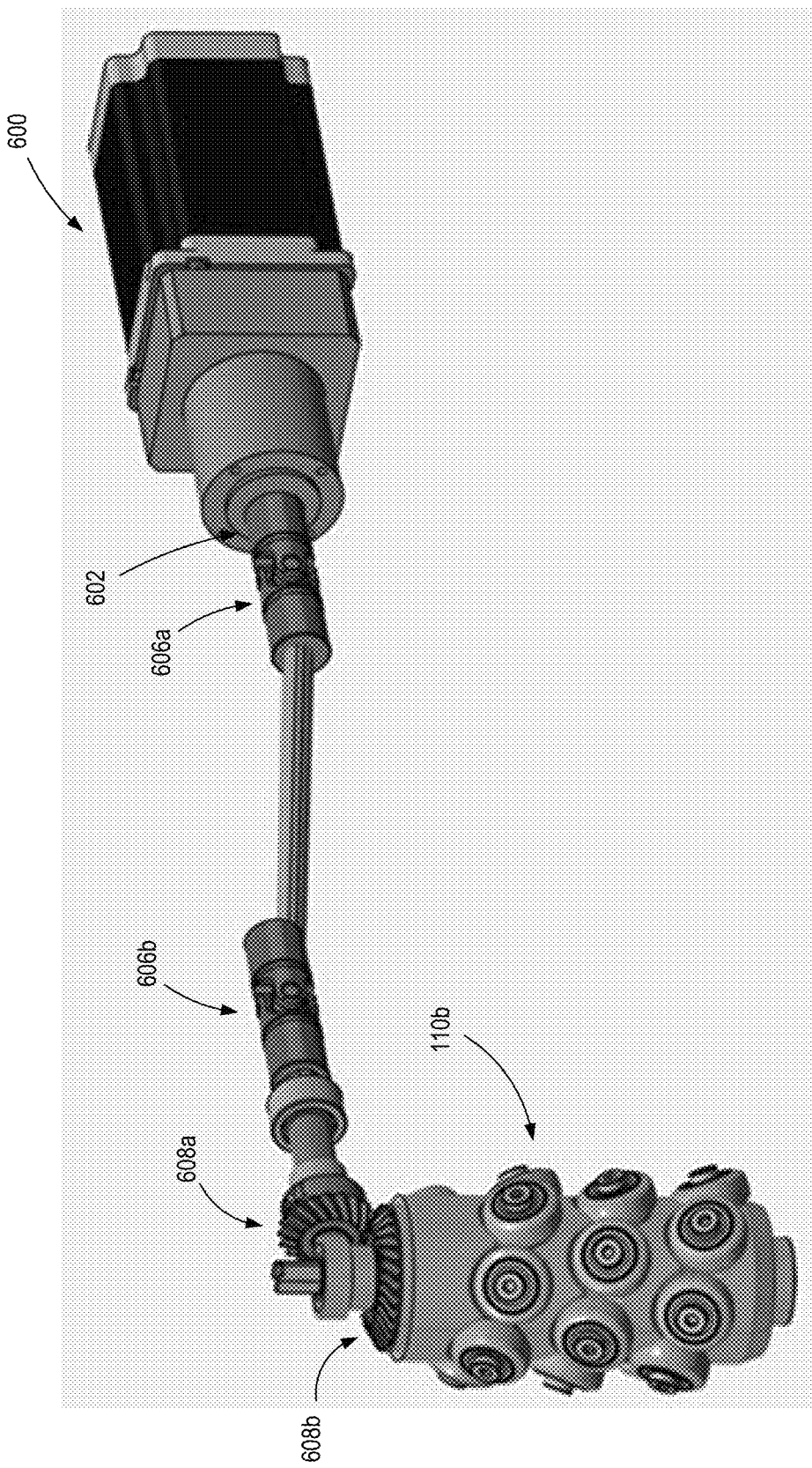
FIG. 6B illustrates a perspective view of an exemplary drive component and an exemplary discrete roller assembly-based roller worm, according to some embodiments.

Referring to FIGS. 6A and 6B, a perspective view of a drive component 600 and a roller worm 110 is illustrated. In some cases, as illustrated in FIGS. 6A and 6B, the roller worm 110 can be coupled to an output shaft 602 of a drive component 600. The drive component 600 may be a motor or a motor and gearbox, where the output shaft 602 can cause rotation of the roller worm 110 about the central axis 115 of the roller worm 110. In some cases, an external computing device and/or computing system communicatively connected to the drive component 600 may control the drive component 600 and subsequent rotation of the roller worm 110. The computing device and/or computing systems may include at least one processor at least one memory storing computer-readable instructions that may be executed by the at least one processor (e.g., to control the drive component 600 and rotation of the roller worm 110). In some cases, coupling of the output shaft 602 to the roller worm 110 may be accomplished by means of one or more gears, chains, belts, and/or shafts connecting the output shaft 602 to the roller worm 110a. As an example, as illustrated in FIG. 6A, the roller worm 110a can be coupled to the output shaft 602 by a belt 604 (e.g., a toothed timing belt). As another example, as illustrated in FIG. 6B, the roller worm 110b can be coupled to the output shaft 602 by a pair of u-joints 606a and 606b and a pair of miter, bevel, and/or hypoid gears 608a and 608b configured to transmit torque between the drive component 600 and the roller worm 110b (e.g., when the drive component 600 and the output shaft 602 are positioned orthogonally to the central axis 115 of the roller worm 110b). In some cases, a drive component 600 can be positioned and mated with the roller worm 110 in a direct drive scenario, such that an axis of rotation of the output shaft 602 of the drive component 600 is collinear with and connected to the central axis 115 of the roller worm 110a. In some cases, the drive component 600, components connected to the drive component 600 (e.g., output shaft 602, gears, chains, belts, etc.), and an optional gear reduction element can be housed within an interior cavity of the body portion 112 of the roller worm 110, thereby enabling the roller worm 110 to rotate without use of a drive component 600 external to the roller worm 110.

In some embodiments, coupling between the roller worm 110 and the output shaft 602 can be used to transmit torque bi-directionally between the drive component 600 and the roller worm 110. As an example, to control a position of the roller worm 110a along on the engagement structure 150a, the drive component 600 and the output shaft 602 may transmit, via the belt 604, torque to rotate the roller worm 110a, thereby causing the roller worm 110a to translate along the tracks 160a of the engagement structure 150a via the engagement between the roller assemblies 130 and the contact surfaces 162 of the tracks 160. As another example, based on the forces (e.g., gravitational forces) acting on the roller worm 110a, the roller worm 110a may (i) rotate about the central axis 115, (ii) translate (e.g., translate downward) along the engagement structure 150a, and (ii) transmit a torque to the output shaft 602 and the drive component 600 based on the rotation and translation.

In some embodiments, any number of materials may be used for the body portion 112 of the roller worm 110 on which the roller assemblies 130 are coupled (e.g., mounted). In some cases, the body portion 112 may be made of and/or include steel, aluminum, brass, and/or engineering plastics. As an example, the body portion 112 may be made of steel for strength and durability purposes. In some cases, the engagement structure 150 may be made of and/or include steel, aluminum, brass, and/or engineering plastics. As an example, the engagement structure 150 may be made of steel for strength and processability (e.g., fabrication) purposes. In some cases, the roller elements 134 of the roller assemblies 130 may be made of and/or include steel, aluminum, brass, and/or engineering plastics. As an example, a roller element 134 may be comprised of steel for durability purposes and for having a closely matching coefficient of thermal expansion to the roller assembly 130.

In some embodiments, one or more supporting and/or positioning elements may be used with the roller worm 110 to restrict relative movement between the roller worm 110 and the engagement structure 150. The one or more supporting and/or positioning elements may restrict relative movement between the roller worm 110 and the engagement structure 150 to (i) rotational movement around the central axis 115 of the roller worm 110 and linear translation along the primary axis 172, such that rotation of the roller worm 110 is converted to linear translation along the primary axis 172. For example, one or more supporting and/or positioning elements may be configured to cause the roller worm to linearly translate along the primary axis 172 based on rotation of the roller worm about the central axis 115. As illustrated in FIG. 6A, a supporting element may be fixed to both the roller worm 110 and the drive component to retain the roller worm 110 along the engagement structure 150.

In some embodiments, a helical drive system 100 including a roller worm 110 and an engagement structure 150 may be applied for use in AS/RS systems. For example, a number of engagement structures 150 may be coupled to rails of a structure including a number of cuboidal cells. The cuboidal cells may be repeated to form a larger structure in a 3D array, so as to form a multi-level storage rack for item storage. To form the repeating structure, multiple cuboid cells can be aligned in rows, columns, and depth, which are also configurable, so that the repeating structure is designed to be modular for being easily adaptable to constraints in existing buildings, such as irregular walls, ceiling heights, or building mechanical elements. A single material handling robot may be connected to and may control rotation of a number of roller worms 110 to navigate in a 3D environment from any cell to any cell, where the roller worms 110 are configured to engage with the engagement structures 150 that are connected to the rails forming the cells. According to some embodiments, an AS/RS system incorporating the roller worm 110 and engagement structure 150 may be a part of a material and conveyance and storage system that uses an automated material handling robot to store materials in a repeating structure (with repeated units such as cuboid cells) for retrieval at a later time. The automated material handling robot may transport the materials (also referred to as payload) by carrying the payload while traversing the repeating structure along any axis (e.g., +/−, X, Y, Z) from any cell to any adjacent cell. Here "+/−" may mean a forward/backward, left/right, or upward/downward navigation of a material handling robot along each X, Y, or Z axis in a 3D environment. Additional descriptions for an AS/RS system and related computing devices that can use and control the roller worm 110 and the engagement structure 150 is included in U.S. patent application Ser. No. 18/493,278, which is hereby incorporated by reference herein in its entirety.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

With respect to a roller worm as described herein, a "screw" gear often refers to translation of motion (e.g. lead screw) and a "worm" gear traditionally includes an involute-curve tooth profile. Based on a "roller screw" existing as a separate, pre-existing device, a roller worm may be the next most appropriate nomenclature as to not confuse with the existing roller screw.

What is claimed is:

1. A roller worm configured for translation along a primary axis, the roller worm comprising:
   a body portion; and
   a plurality of discrete roller assemblies disposed in a first helical pattern about the body portion, wherein the roller worm is configured to rotate about a central axis to cause linear translation of the roller worm along a length of an engagement structure and the primary axis, wherein a ratio of a pitch of the first helical pattern to a diameter of the body portion is in a range of 0.3 to 3.2.

2. The roller worm of claim 1, wherein the body portion comprises a cylindrical structure comprising a first circular base, a second circular base, and a central body portion connecting the first circular base to the second circular base.

3. The roller worm of claim 2, wherein the central axis extends through a center of each of the first circular base and the second circular base.

4. The roller worm of claim 2, wherein a surface of the central body portion is parallel to the central axis.

5. The roller worm of claim 1, wherein the central axis is parallel to and collinear with the Primary axis.

6. The roller worm of claim 1, wherein the central axis is not parallel to the primary axis.

7. The roller worm of claim 1, wherein the roller assemblies have at least one of a cylindrical structure, a conical structure, or an ellipsoid structure.

8. The roller worm of claim 1, wherein the roller assemblies are disposed in the first helical pattern for at least one turn about the body portion.

9. The roller worm of claim 1, wherein the roller assemblies extend from a surface of the body portion along a respective roller assembly axis at an angle greater than 0 degrees and less than 180 degrees relative to the central axis.

10. The roller worm of claim 1, wherein a ratio of a diameter of each of the roller assemblies to a diameter of the body portion is in a range of 0.2 to 0.6.

11. The roller worm of claim 1, wherein at least one of the roller assemblies comprises a roller element on an exterior of the roller assembly, wherein the roller element is configured to rotate about a roller assembly axis.

12. The roller worm of claim 11, wherein the at least one of the roller assemblies further comprises (i) at least one inner race coupled to the body portion and (ii) at least one outer race rotationally coupled to the at least one inner race and configured to rotate about the roller assembly axis, wherein the roller element is coupled to the at least one outer race or the at least one outer race comprises the roller element.

13. The roller worm of claim 1, wherein the engagement structure comprises a plurality of tracks disposed along the length of the engagement structure.

14. The roller worm of claim 13, wherein each of the tracks is configured to receive at least one of the roller assemblies.

15. The roller worm of claim 13, wherein each of the tracks comprises a complementary geometry relative to the roller assemblies.

16. The roller worm of claim 13, wherein each of the tracks comprises at least one contact surface configured to contact at least one of the roller assemblies.

17. The roller worm of claim 16, wherein the roller assemblies are configured to (ii) rotate about the central axis and (ii) contact the contact surfaces to cause translation of the roller worm along the length of the engagement structure.

18. The roller worm of claim 13, wherein the tracks are disposed in a second helical pattern along the length of the engagement structure, wherein a first pitch of the first helical pattern is equivalent to a second pitch of the second helical pattern.

19. The roller worm of claim 13, wherein the tracks are evenly spaced along the length of the engagement structure.

20. The roller worm of claim 1, wherein a drive component is configured to cause rotation of the roller worm.

21. The roller worm of claim 1, wherein at least one supporting element is configured to cause the roller worm to linearly translate along the primary axis based on rotation of the roller worm about the central axis.

22. A helical drive system comprising:
a roller worm comprising:
a body portion; and
a plurality of discrete roller assemblies disposed in a first helical pattern about the body portion, wherein a ratio of a pitch of the first helical pattern to a diameter of the body portion is in a range of 0.3 to 3.2; and
an engagement structure comprising a primary axis, wherein the roller worm is configured to rotate about a central axis to cause linear translation of the roller worm along a length of the engagement structure and the primary axis.

23. The helical drive system of claim 22, wherein the body portion comprises a cylindrical structure comprising a first circular base, a second circular base, and a central body portion connecting the first circular base to the second circular base.

24. The helical drive system of claim 23, wherein the central axis extends through a center of each of the first circular base and the second circular base.

25. The helical drive system of claim 23, wherein a surface of the central body portion is parallel to the central axis.

26. The helical drive system of claim 22, wherein the central axis is parallel to and collinear with the primary axis.

27. The helical drive system of claim 22, wherein the central axis is not parallel to the primary axis.

28. The helical drive system of claim 22, wherein the roller assemblies have at least one of a cylindrical structure, a conical structure, or an ellipsoid structure.

29. The helical drive system of claim 22, wherein the roller assemblies are disposed in the first helical pattern for at least one turn about the body portion.

30. The helical drive system of claim 22, wherein the roller assemblies extend from a surface of the body portion along a respective roller assembly axis at an angle greater than 0 degrees and less than 180 degrees relative to the central axis.

31. The helical drive system of claim 22, wherein a ratio of a diameter of each of the roller assemblies to a diameter of the body portion is in a range of 0.2 to 0.6.

32. The helical drive system of claim 22, wherein at least one of the roller assemblies comprises a roller element on an exterior of the roller assembly, wherein the roller element is configured to rotate about a roller assembly axis.

33. The helical drive system of claim 32, wherein the at least one of the roller assemblies further comprises (i) at least one inner race coupled to the body portion and (ii) at least one outer race rotationally coupled to the at least one inner race and configured to rotate about the roller assembly axis, wherein the roller element is coupled to the at least one outer race or the at least one outer race comprises the roller element.

34. The helical drive system of claim 22, wherein the engagement structure comprises a plurality of tracks disposed along the length of the engagement structure.

35. The helical drive system of claim 34, wherein each of the tracks is configured to receive at least one of the roller assemblies.

36. The helical drive system of claim 34, wherein each of the tracks comprises a complementary geometry relative to the roller assemblies.

37. The helical drive system of claim 34, wherein each of the tracks comprises at least one contact surface configured to contact at least one of the roller assemblies.

38. The helical drive system of claim 37, wherein the roller assemblies are configured to (i) rotate about the central axis and (ii) contact the contact surfaces to cause translation of the roller worm along the length of the engagement structure.

39. The helical drive system of claim 34, wherein the tracks are disposed in a second helical pattern along the length of the engagement structure, wherein a first pitch of the first helical pattern is equivalent to a second pitch of the second helical pattern.

40. The helical drive system of claim 34, wherein the tracks are evenly spaced along the length of the engagement structure.

41. The helical drive system of claim 22, wherein a drive component is configured to cause rotation of the roller worm.

42. The helical drive system of claim 22, wherein at least one supporting element is configured to cause the roller worm to linearly translate along the primary axis based on rotation of the roller worm about the central axis.

* * * * *